United States Patent [19]

Béraud et al.

[11] Patent Number: 4,464,782
[45] Date of Patent: Aug. 7, 1984

[54] TRANSMISSION PROCESS AND DEVICE FOR IMPLEMENTING THE SO-IMPROVED PROCESS

[75] Inventors: Jean-Paul Béraud, Saint Laurent du Var; Claude Galand, Cagnes sur Mer, both of France

[73] Assignee: International Business Machines Corporation, Armonk, N.Y.

[21] Appl. No.: 346,475

[22] Filed: Feb. 8, 1982

[30] Foreign Application Priority Data

Feb. 27, 1981 [EP] European Pat. Off. ........ 81430004.2

[51] Int. Cl.³ .......................... G10L 1/00; H04J 6/02
[52] U.S. Cl. ..................................... 381/31; 375/122
[58] Field of Search .................................. 381/29–40; 375/122

[56] References Cited

U.S. PATENT DOCUMENTS

| | | | |
|---|---|---|---|
| 4,142,071 | 2/1979 | Croisier et al. | 381/29 |
| 4,191,858 | 3/1980 | Araseki | 381/31 |
| 4,216,354 | 8/1980 | Esteban et al. | 381/31 |

Primary Examiner—E. S. Matt Kemeny
Attorney, Agent, or Firm—John B. Frisone

[57] ABSTRACT

An improved split-band coder reduces signal-processing time, thereby reducing echo delay time and listener confusion. The voice-originated signal to be transmitted over a transmission line is sampled and digitally coded at a relatively high bit rate; the spectrum of said signal is then partitioned into p sub-bands. The sample stream of the signal so-filtered and partitioned into p sub-bands is split into blocks of samples, or portions, of a given time duration. A requantizing device proceeds for each block to the requantizing of the samples in each sub-band by means of requantizing parameters derived from the samples of the preceding sample block, whereas new requantizing parameters are determined and stored with a view to requantizing the following sample block. The requantized samples in the different sub-bands are multiplexed, and transmitted over the transmission line, together with the values of the highest amplitude samples in each sub-band.

5 Claims, 8 Drawing Figures

FIG. 7

TRANSMISSION PROCESS AND DEVICE FOR IMPLEMENTING THE SO-IMPROVED PROCESS

DESCRIPTION

1. Technical Field of the Invention

This invention relates to digital communications techniques and, more particularly, coding techniques for coding a speech signal to be duplex-transmitted.

2. Background of the Invention

The conversion of a time-varying signal into digitally coded information, may be performed by sampling the signal and quantizing the signal samples. This implies a preliminary partitioning of the scale used to measure the signal amplitudes, into sections, and the attribution of a single digital value to each of said sections. When the signal quantizing operation is carried out, i.e., when the signal sample are converted into digital values, all the samples of the signal the amplitudes of which fall within the limits of a section, are coded with the same digital value. This results in an error between the original signal and its coded form. This error is called quantizing noise. It is obvious that narrowing the sections would reduce the error. But, for a given scale, this would increase the number of sections and, therefore, the number of digital values required for coding, and, consequently, the number of bits required to obtain a digital definition of the sections. This increases the complexity of the devices required for the subsequent processing of the digital signal, and also in congestion of the signal transmission channels between the transmitter and receiver. Attempts have been made to reduce the bit rate required for the coding operation while maintaining a satisfactory signal-to-noise ratio. On the other hand, attempts have been made to utilize a fixed number of bits more efficiently to effect an overall reduction in quantizing noise.

Differential or "delta PCM" coding processes is one example. In this method the quantizing bits are used for coding signal changes between two consecutive sampling instants instead of coding the absolute amplitude of each sample. The swing of the information to be quantized is thus reduced, and a better use of the quantizing bits can be achieved by partitioning the sections into a narrower range than would have been possible with the same number of bits in the original instance.

More recent improvements have taken advantage of the statistical characteristics of the signal to be coded. For instance, since it appears that the energy of the voice-originated signals is generally concentrated into the low frequency zones of the voice spectrum, it has been proposed to allocate more bits to the quantization of these zones, therefore, to code the signals in these zones with better accuracy than the signals located in the high frequency bands. As an example of an embodiment of this type, one may refer to the article of Crochiere et al published in the Bell System Technical Journal, October 1976. In the process disclosed therein, the speech signal is first divided into sub-bands by a bank of adjacent band-pass filters covering the whole telephone frequency range. The resulting signal bandwidths are then shifted into the base-band by modulation, and they are sampled at their Nyquist frequency. Then, each signal (in each sub-band) is quantized separately, in a non-uniform manner, i.e., by allocating more bits to the lower bands than to the higher bands. A statistical study makes it possible to choose different quantizing bit rates and to define an appropriate distribution of the bits, between the sub-bands. Such a type of coding, however, is based on statistical data and not on the actual situations and, therefore, does not provide an optimum coding means.

In other systems, the quality of the signal coding operation has been improved by having the bit allocation based on the charactristics of the signal itself rather than on the statistical nature of a typical voice signal.

New techniques have been developed to keep the coder from being too complex, and, therefore, to get practical coding and decoding systems. Such a technique has been disclosed in U.S. Pat. No. 4,142,071, the disclosure of which is incorporated herein by reference. The disclosed process applies essentially to the so-called BCPCM type of coding, wherein the signal is coded by portions, in the time domain (blocks of K samples per portion). The signal, in addition, is partitioned into p sub-ranges (or sub-bands), in the frequency domain and each sub-band is coded separately and according to its own characteristics. More specifically, a number of coding parameters, and more particularly the number of quantizing bits $n_i$ to be allocated for the quantization of the signal of the $i^{th}$ sub-band, and set for a block of K samples, is derived from the characteristics of these K samples. In other words, with the process disclosed in the above mentioned U.S. Patent, optimization of the allocation of the bit resources of the coding system is made possible. More particularly, an efficient use of the bit rate allocated to the quantization which should be based on the characteristics of the signal to be coded, is achieved.

However, since the quantization operation of a signal portion requires the prior derivation of parameters from the characteristics of this very portion of the signal, relatively long processing delays are encountered. This can be a hindrance, more particularly when the coding process is to be implemented within a communications system operating in full-duplex; in other words, when a transmission channel and a reception channel are simultaneously operational. In this case, everything should happen, for the speakers placed at each extremity of the communications system, as if they were facing each other and were speaking in real time. But, in practice, the information conveyed through the transmission and reception channels interfere with each other, and a so-called echo phenomenon results, i.e., the information transmitted by the speaker comes back to him after a lapse of time.

The so-called echo phenomenon is particularly unpleasant for the speaker. When the time delay between the transmission of a signal and the reception of an echo through feedback from transmission path into the reception path, is short, the human ear accepts it and the speaker is not disturbed. Beyond a given time delay limit (~25 ms), no intelligible conversation is possible. Solutions have been proposed to solve the problem. These solutions, generally, are of either of the following types. A first type relatively simple and inexpensive consists in interrupting the reception channel of the person who is speaking. This solution destroys the advantages of full-duplex conversational. The second type maintains the advantages of full-duplex transmission but requires the use of echo suppressors of the adaptive equalizer type, which are complex and expensive.

The echo problems described above are more acute when making use of communications systems coders/decoders of the type described in the above-mentioned U.S. Patent.

While these techniques make it possible to optimize the coding operation by dynamically adapting the bit resources of the coder and, more particularly, of the quantifier belonging to said coder, to the characteristics of the signal to be transmitted, they, however, increase the time delay between the moment a sound is pronounced and the moment it is transmitted. As a result of this any feedback of the transmission channel to the reception channel automatically produces an extremely disturbing echo.

In fact, the signals are processed in blocks of several samples from which quantizing parameters are dynamically derived. For instance, the number of the quantizing bits to be used for the coding operation of a block of samples is derived from this very block. This causes a time delay elapse between the moment these samples appear at the coder input and the moment the same samples appear at the decoder output, after quantization. Said delay is far longer that those involved in more conventional coders. This produces an unavoidable disturbing echo.

SUMMARY OF THE INVENTION

An object of this invention is to provide a process for reducing the echo effects in a full-duplex communications system making use of the BCPCM-type techniques.

Another object of this invention is to provide a process for reducing the echo effects in a full-duplex communications system.

More specifically, this invention concerns a transmission process for transmitting a voice-originated signal the spectrum of which extends within a given frequency band. The signal is sampled and quantized at a relatively high bit rate. The signal is filtered into several sub-bands and the sample streams of the various sub-bands is partitioned into sample blocks with a given time duration. Each of said blocks is subjected to a requantizing process during which the following operations are performed: measurement of the parameters connected to the energy of the signal in each of the sub-bands; determination of a requantizing step for each sub-band with respect to said parameters; requantizing of the subsequent block using said requantizing step; and transmission, through a multiplexing operation, of the requantized samples within the p sub-bands as well as of the requantizing parameters.

The foregoing and other objects features and advantages of the invention will be apparent from the following more particular description of a preferred embodiment of the invention, as illustrated in the accompanying drawings.

DESCRIPTION OF THE PREFERRED EMBODIMENT

Let S(nt) be the sampled signal to be coded. Let us assume that its spectrum is partitioned into p adjacent sub-bands which are quantized separately but in such a way that the total number of quantizing bits is constant and equal to N. In a conventional coding system, all the sub-bands are submitted to quantizing with a constant number of bits, i.e., which is time-variant. This results in a certain quantizing noise which could be reduced provided that, instead of quantizing all the sub-bands with a constant bit rate, one tries to distribute the quantizing bit resources in a somewhat more efficient way.

In the above-mentioned U.S. Patent, there is defined a process well suited for the processing of voice-originated signals. In order to understand such a process, it will be assumed that $n_i$ stands for the number of the bits available for quantizing the signal derived from S(nt) and contained within the $i^{th}$ sub-band.

In addition, $E_i$ stands for the energy in this same sub-band, before quantizing. The quantizing noise introduced on channel i satisfies, in a first approximation, relation $$e_i \simeq E_i \cdot 2^{-2n_i}$$

The mean quadratic error over all the p sub-bands, is then equal to:

$$e = \sum_{i=1}^{p} E_i \cdot 2^{-2n_i}$$

and, in addition, one has:

$$\sum_{i=1}^{p} n_i = N$$

Therefore, the error e is minimum when all the terms of the sum providing e are equal to one another. If one assumes that $$E_i \cdot 2^{-2n_i} = k \text{ where } \begin{cases} k \text{ is a constant and} \\ i = 1, 2, 3, \ldots, p. \end{cases}$$

It results therefrom:

$$n_i = -\log k^{\frac{1}{2}} + \log E_i^{\frac{1}{2}}$$

where $\begin{cases} \log \text{ designates a} \\ \text{base two logarithm.} \end{cases}$ $$n_i = \sigma + \log E_i^{\frac{1}{2}}$$

with $$\sigma = -\log k^{\frac{1}{2}}$$

-continued $$N = \sum_{i=1}^{p} n_i = p\sigma + \log \prod_{i=1}^{p} E_i^{\frac{1}{2}}$$

wherefrom $$\sigma = \frac{N - \log \prod_{i=1}^{p} E_i^{\frac{1}{2}}}{p}$$

Therefore, the bit rate to be allocated to the quantization of the $i^{th}$ sub-band so as to minimize the overall quantizing error over all the sub-bands, is as follows:

$$n_i = \frac{N - \log \prod_{j=1}^{p} E_j^{\frac{1}{2}}}{p} + \log E_i^{\frac{1}{2}} \qquad (1)$$

Since $n_i$ is indicative of a number of bits, in fact, one keeps only an approximate integer value from the result of operation (1).

Thus, there is obtained a means based on the measurements of the energies contained in the various sub-bands, for efficiently and dynamically distributing the quantizing bit resources.

To this end, after partitioning the signal into p sub-bands, one should measure the energy contained in each of said sub-band, derive the value of the bit rate to be allocated to the quantization of each sub-band, by applying formula (1), and use this value to control the quantizer operation.

In practice, the adjustments of the quantizer will take place for a given period of time, i.e., for a block of several samples. In this way, it is possible to determine the amplitude limits within which the signal varies during this period of time. From the comparison of these limits and from the allocated bit rate, one derives the value of quantizing step Q to be chosen for quantizing the related sub-band. For instance, if it is assumed that the amplitude of the $i^{th}$ sub-band varies between $-5$ volts and $+5$ volts and that the bit rate allocated to it is $n_i=1$, a step $Q_i=5$ volts could be chosen. This means that all the samples exceeding zero volt will be coded by a "0", the samples lower than zero will be, by a "1".

When the signal is partitioned into sufficiently narrow sub-bands, in the frequency domain, the spectrum in each channel is relatively flat. It is then recognized that the energy in each sub-band is proportional to the square of the amplitude (in absolute value) of the largest sample (M) contained in the considered sub-band. Therefore:

$$E_i = \lambda \cdot M_i^2 \qquad (2)$$

λ being a coefficient of proportionality, and
$M_i$ the amplitude of the largest sample contained in the $i^{th}$ sub-band.

By combining expressions (1) and (2), one obtains:

$$n_i = 1/p \left[ N - \log \prod_{j=1}^{p} M_j \right] + \log M_i \qquad (3)$$

$$= 1/p \left[ N - \sum_{j=1}^{p} \log M_j \right] + \log M_i$$

If one wishes to make use of digital circuits to carry out the quantizing operations of this invention, previously coded signals will have to be used in the process. This prior coding is effected in a conventional way using a constant high bit rate in order to be more precise. Then the device according to the invention is used for requantizing the signal samples, which tends to perform a more efficient distribution of the available bits.

With the device shown in FIG. 1 it is possible to implement the requantizing process disclosed above (for the time being, device BUFF will not be described, its extremely important function in this application will be developed later on). Once signal S(nt) has been sampled and PCM encoded with a constant high bit rate, it supplies samples $X_S$ which are transmitted to a filter bank FB. This filter bank divides the signal into p sub-bands $B_i$ containing samples $X^i$ (with $i=1, 2, \ldots, p$). An energy measuring device Em sorts, on each sub-band, the samples it receives during a given period of time (i.e., on a signal portion or, in other words, on a sample block of a given time duration), so as to determine the largest of said samples ($M_i$). In other words, Em determines values $M_i$ for $i=1, 2, \ldots, p$. These values are, then, applied to a logarithm generator LOG, which provides the values log $M_j$. These can be read from a table storage the coordinates of function $y=2^x$, or can be generated by a microprocessor the program of which causes the base two logarithm of $M_i$ to be calculated from an approximating convergent series. The values of Log $M_i$ are then fed into an adder SOM which adds them with a gain $1/p$ and subtracts the result of this operation from the predetermined value $N/p$. Therefore, device SOM generates term $\sigma$. At this point, one has all the elements of information for permitting the sub-bands to be requantized. Therefore, the assembly of device Em, LOG and SOM is used to generate parameters for requantizing the speech signal samples. The so-formed parameter generator has been referred to as PAR.

Figure 2:
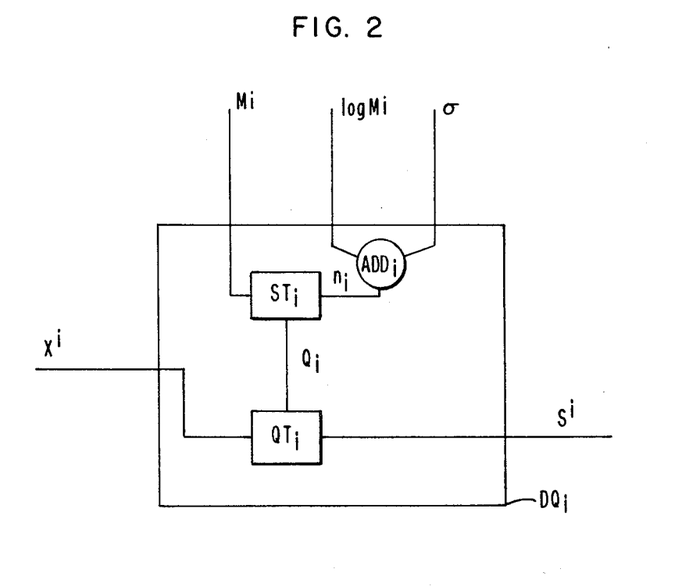
FIG. 2, is a schematic diagram of one of the circuit elements of the requantizer shown in FIG. 1.

Let $DQ_i$ be the device for requantizing the $i^{th}$ sub-band. As shown in FIG. 2 $DQ_i$ is comprised of: circuit $ADD_i$, requantizing step generator $ST_i$ and requantizer $QT_i$. The add operation of Log $M_i$ and of $\sigma$ in $ADD_i$ provides $n_i$ which is used in STi to generate the quantizing step $Q_i$ by carrying out the following operation:

$$Q_i = \frac{M_i}{2^{n_i-1}} \qquad (4)$$

The quantizing step $Q_i$ being provided to quantizer $QT_i$, said quantizer requantizes the $X^i$'s with bit rate $n_i$, thus generating a new digital sequence $s^i$.

If it is assumed, by way of an example, that $n_i=1$, the quantizing step $$Q_i = M_i. \qquad (5)$$

Device $QT_i$, then, performs a mere signal detection over $X^i$. When $X^i \geq 0$, QTi will provide $S^i=0$, whereas when $X^i<0$, it will provide $X^i=1$ (it should be noted that since the system is operated in two's complement code, by convention, "zero" is indicative of the positive sign and "one" is indicative of the negative sign).

Thus, the $X^i$'s initially PCM-coded with a constant high bit rate of sixteen bits, for instance, are requantized with one bit.

For $n_i=2$, four levels can be coded, for $n_i=3$, eight levels can be coded, and so on. These coding operations are performed by partitioning, in a conventional way, the maximum amplitude variation range of the sub-band of order i, defined by $M_i$, into as many amplitudes portions as there are levels which can be coded by means of the number of the allocated bits $n_i$.

Figure 1:
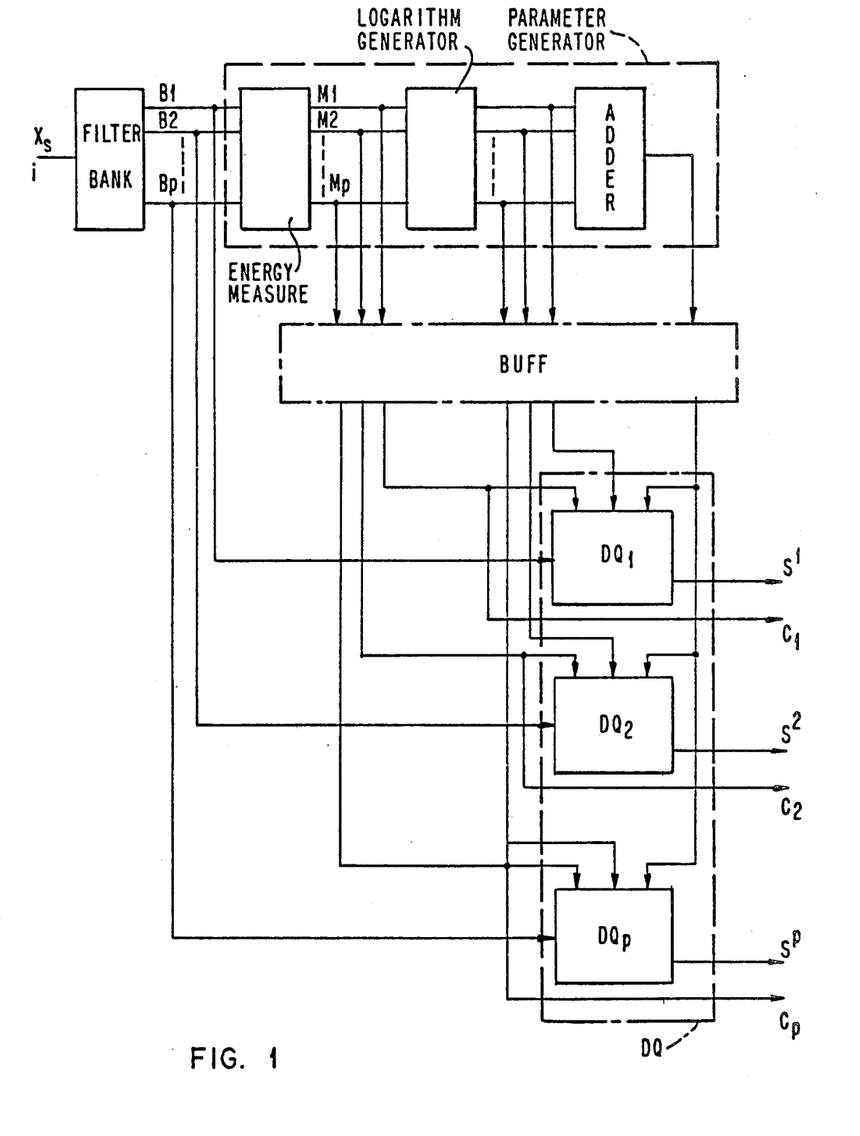
FIG. 1, is a schematic diagram of a requantizer as used in this invention.

The assembly of the DQi's is indicated by DQ in FIG. 1.

From a consideration of the above, it appears that the use of the disclosed process requires the analysis of the subbands contents over a predetermined period of time. Meanwhile, it seems not very efficient to change $n_i$ and the quantizing step for each sample $X^i$. On the other hand, this process seems to be particularly suited for a coding operation performed on blocks of samples, i.e. coding of the so-called BCPCM-type which can be summarized as follows: for each block of K samples obtained by splitting the sample stream to be coded into sample portions of a given time duration, a scale factor C is chosen such that the largest sample of the block may not reside outside the coding limits. Then, the K samples of the block are quantized. The scale factor (block characteristics) and the K samples of the block, provide the digital information fully defining the block. For a more detailed description of this type of coding, one may refer to the article by A. Croisier relating to a lecture given at the 1974 International Seminar on Digital Communications in Zurich, Switzerland, and entitled: Progres in PCM and delta Modulation: Block Companded Coding of Speech Signal".

In this invention, $n_i$ will be defined for the duration of each block and for the $i^{th}$ sub-band.

The value of $M_i$, or an approximate value, can be chosen for $C_i$ (scale factor of the $i^{th}$ sub-band), in which case expression (3) becomes:

$$n_i = \frac{N - \log \prod_{j=1}^{p} C_j}{p} + \log C_i \quad (6)$$

Of course, to decode the signal and recover the information of the voice-originated signal, not only the $S^i$'s of each channel are necessary, but also the $C_i$'s.

The foregoing shows one of the major interests of the disclosed coding process, namely, it shows that given an overall number of coding bits, said bits are used in an optimum and efficient manner, by dynamically allocating them for the quantization of the signal portions, based on the specific requirements determined from the characteristics of this very signal. On the other hand, the coder shall have in its possession the sample block of a signal portion before proceeding to the quantization of this very portion. In other words, the very principle of this type of coding, though of extreme interest, entails a time delay between the input and the output of the coder.

More specifically, let us suppose that a speech signal S(n) provided by a telephone type transmission line, is to be coded by means of a system based on a partitioning into 16 sub-bands and such that the number of samples for each block is equal to 8, for each sub-band channel. Since the bandpass of the telephone lines is lower than 4000 Hz, the signal will be sampled at the Nyquist frequency, namely 8 KHz.

The block of a total of $16 \times 8 = 128$ samples is, therefore, representative of a signal portion having a time duration of $$\frac{128}{8 \times 10^3} = 16 \text{ ms}$$

Therefore, the system initially introduces a time delay of 16 ms between the moment a given signal portion appears at the system input and the moment its processing for requantizing is started. This amount of delay may not be significant in some applications, however, it may be extremely disturbing in a real time communications environment.

Figure 3:
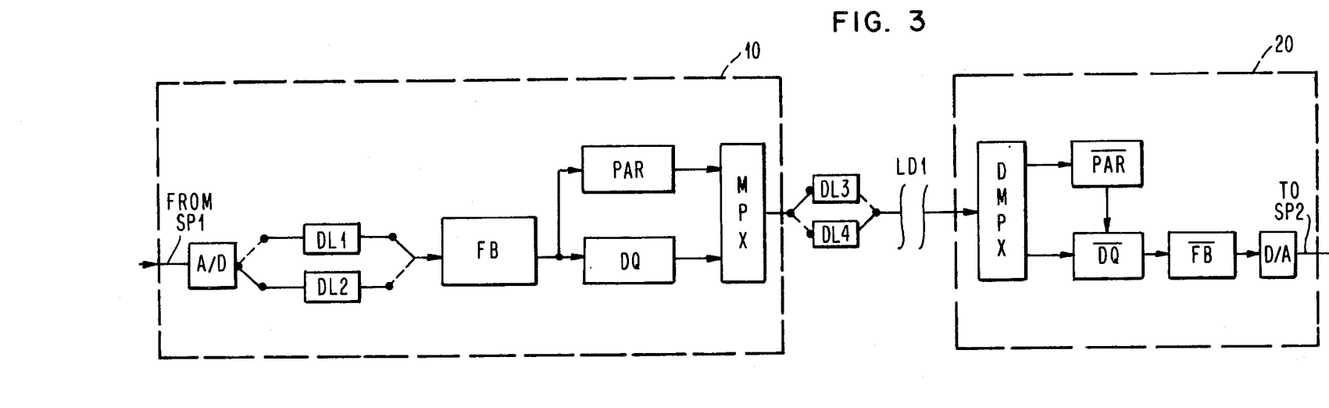
FIG. 3, is a schematic diagram of a digital transmission device making use of the requantizer shown in FIG. 1.

FIG. 3 is a schematic diagram illustrating in a more specific manner the delays introduced between a transmitter station (10) and a receiver station (20) located at opposite ends of a digital transmission line when making use of systems of the type disclosed in the above mentioned U.S. Patent. The input signal sent over a telephone line by speaker Sp1 standing at the input of the transmitter 10 is first coded using a high bit rate by means of converter A/D supplying samples $X_S$. The stream of samples $X_S$ is split into blocks of 16 ms supplied to one of the 16 ms-delay circuits DL1 or DL2. When the chosen delay circuit DL1 (or DL2) is loaded, the processing of the samples it contains can be started while the output of converter A/D is switched to the other circuit DL2 (or DL1). Samples $X_S$ are fed to a filter bank FB which, itself, introduces a 2.5 ms-delay. The output of the filter bank is fed to the parameter generator PAR as well as to requantizer DQ. The generator PAR, which includes the elements referred to as Em, LOG and SOM of FIG. 1, determines the parameters intended for the requantizing operation to be performed by DQ.

The requantizer DQ feeds a multiplexer MPX with 128 requantized samples $S_j^i$ (where i stands for the order of the considered sub-band within the p sub-bands and j stands for the order of the considered sample within the samples of a given block of samples) of the speech signal for each requantized voice-originated signal portion, over the 16 sub-bands. The parameter generator PAR provides the multiplexer MPX with 16 scale factors $C_i$. The multiplexer protects said factors $C_i$ by allocating a parity bit thereto, and adds synchronization bits to the message finally transmitted over the digital transmission line LD1.

Figure 4:
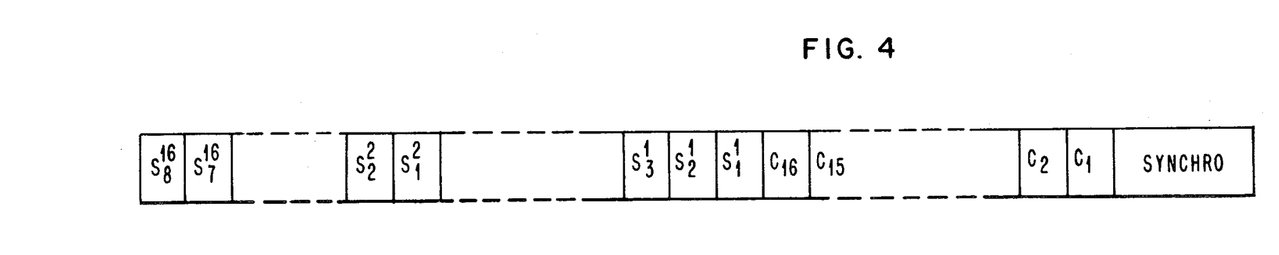
FIG. 4, is a schematic diagram of the format of a data block to be transmitted.

FIG. 4 illustrates the format of a data group transmitted over line LD1. Such a format includes, first, the synchronization bits followed with the 16 values of $C_i$ and then, the 128 requantized speech signal samples.

In fact, before the transmission of a data group over line LD1, the 128 samples $S_1^1$ through $S_8^{16}$ must be available. This has been schematically represented by delay lines DL3 and DL4 each providing a delay of 16 ms, and by two switches which are used to load circuit DL3 while the contents of DL4 is transmitted, and vice versa.

The receiver (20) operates in reverse. Demultiplexer DMPX utilizes the synchronization bits to get synchronized in a conventional way, in order to split the bit stream into bits groups, such as shown in FIG. 4, and extract the parity and synchronization bits, therefrom. Demultiplexer DMPX, then separates the scale factors $C_i$ from samples $S_j^i$. The factors $C_i$ are transmitted to an inverse parameter generator $\overline{PAR}$ while the samples $S_j^i$ are transmitted to an inverse quantizing assembly $\overline{DQ}$.

Generator $\overline{PAR}$ calculates $n_i$'s and $Q_i$'s by applying formulae (6) and (4), assuming that $M_i=C_i$. As to the inverse quantizer $\overline{DQ}$, it sets the speech signal samples back into the form they assumed at the input of the requantizing assembly DQ. When referring back to the above-mentioned example, for $M_i=+5$ and $n_i=1$, DQ would have provided $S^i=$"0" or "1" (i.e., $-1$ in the two-complement form), depending on whether the samples $X^i$ submitted to requantizing by DQ would have been of a value higher or lower than zero volt. One can, thus, proceed to an inverse requantizing according to formula:

| | | $X^i = (S^i + 0.5)$ | $Q_i$. |
|---|---|---|---|
| Therefore, | for | $S^i = 1$ , | $X^i = -2.5$ |
| | for | $S^i = 0$ , | $X^i = 2.5$ |

The information elements coming from $\overline{DQ}$ are filtered in $\overline{FB}$ wherein the p sub-bands are recombined into one single band in order to recover at the output of $\overline{FB}$ the frequency band of the above-originated signal (see FIG. 4 of the above-mentioned U.S. Patent), and then analog-converted in converter D/A before being transmitted through a telephone line, for example, to speaker SP2 standing at the output of converter D/A. Filters $\overline{FB}$ introduce a delay of about 2.5 ms. Consequently, between the moment SP1 utters a sound and the moment the listener SP2 receives this sound by means of the system illustrated, a delay of at least 37 ms has already occured. This delay would not, per se, be a hindrance for SP2. But, should the signal from SP1 to SP2 be sent back to SP1, there would be already a delay of at least 37 ms between the moment speaker SP1 would utter a sound and the moment he would hear the echo of this same sound. As already mentioned above, SP1 cannot bear such an echo and any conversation between SP1 and SP2 becomes impossible.

In practice, the situation is even worse when the network is arranged for full-duplex operation.

Figure 5:
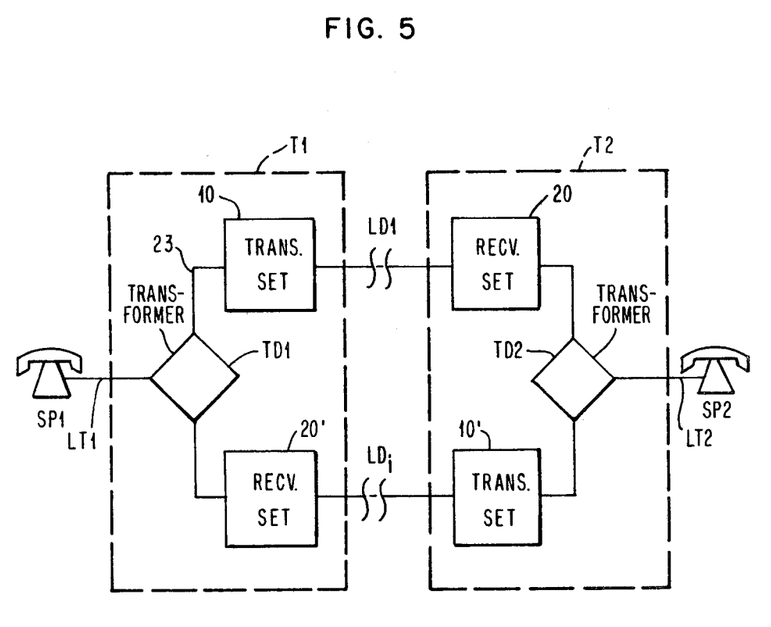
FIG. 5, is a schematic diagram of a duplex-transmission device.

FIG. 5 schematically illustrates the architecture of a full-duplex communications network through which speakers SP1 and SP2 can be connected to each other, by means of telephone-type lines as well as digital-type lines. A substantial bit saving or an optimum coding bit allocation is achieved by making use of a network such as illustrated in FIG. 3, for digital lines (LD1, LD'1 in FIG. 5). As to the transmission on the telephone-type lines LT1 and LT2, a substantial telephone line saving is achieved by making use of a system with differential transformers TD1, TD2, of the conventional type. More specifically, with the differential transformers TD1, TD2, it is possible to connect the telephone sets belonging to speakers SP1 and SP2 and connected to telephone lines LT1 and LT2, to two wires through the digital-type Transmission/Reception sets T1 and T2 which are connected to each other by digital-type lines LD1 and LD'1. Transformer TD1 separates the transmission channel from the reception channel of speaker SP1. Transmission path or channel (23) passes through a digital-type transmission set 10 which is connected to digital transmission line LD1. A digital-type reception set 20 at the other end is connected to line LD1. The assembly comprised of transmitter 10, line LD1 and receiver 20, which ensures transmission from TD1 to TD2, is in every respect similar to that shown in FIG. 3. It, therefore, introduces a delay of at least 37 ms between the differential transformers TD1 and TD2. An assembly comprised of transmitter 10', digital transmission line LD'1 and receiver 20', similar to the assembly 10, LD1 and 20, ensures the connection from TD2 to TD1. A differential transformer normally ensures good separation between the transmission and reception paths which are connected thereto, provided said transformer is balanced. In practice, because a perfect balance is rarely achieved, due to an imperfect knowledge of the impedances of lines LT1 and LT2, part of the signal in the transmision path of the differential transformer is reinjected into the reception path. This causes the echo phenomenon. The echo affecting speaker SP1 from TD1 is negligible. Indeed, the time delay of echoes dues to TD1, is small and such an echo is not disturbing. The echo which is particularly disturbing is the echo caused by differential transformer TD2. When keeping in mind the delay values mentioned in reference to FIG. 3, it may be seen that the echo caused by TD2 has a delay of $2\times37=74$ ms. In other words, the sounds uttered by speaker SP1 comes back to him after, at least, 74 ms and this, with a sufficient level preventing SP1 to converse in an intelligible way.

Figure 6:
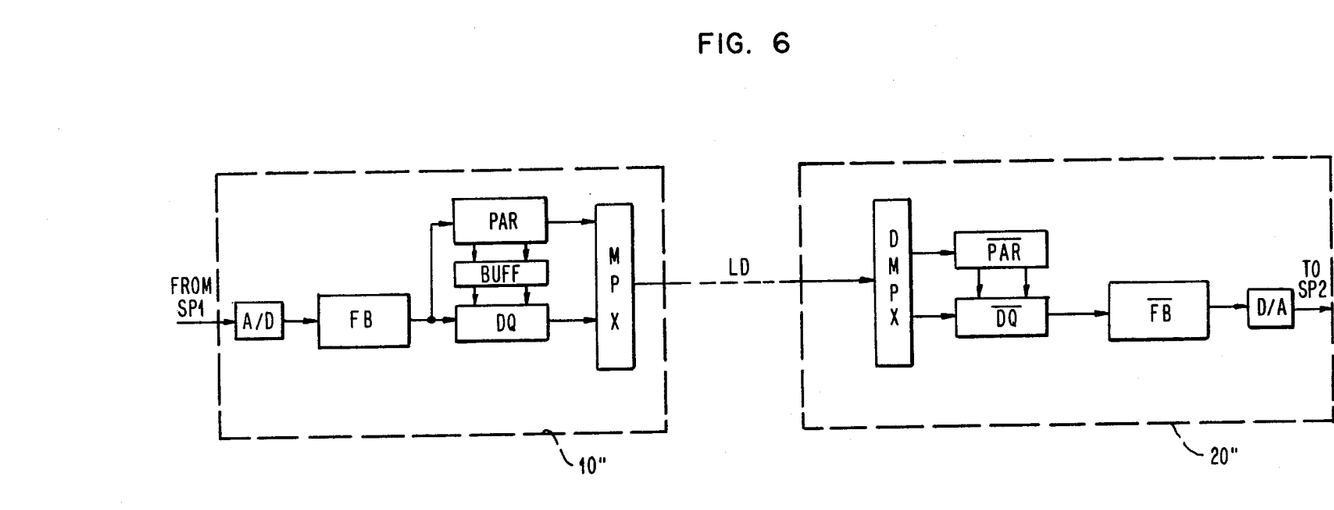
FIG. 6, is a schematic diagram of a digital transmission device according to this invention.
Figure 7:
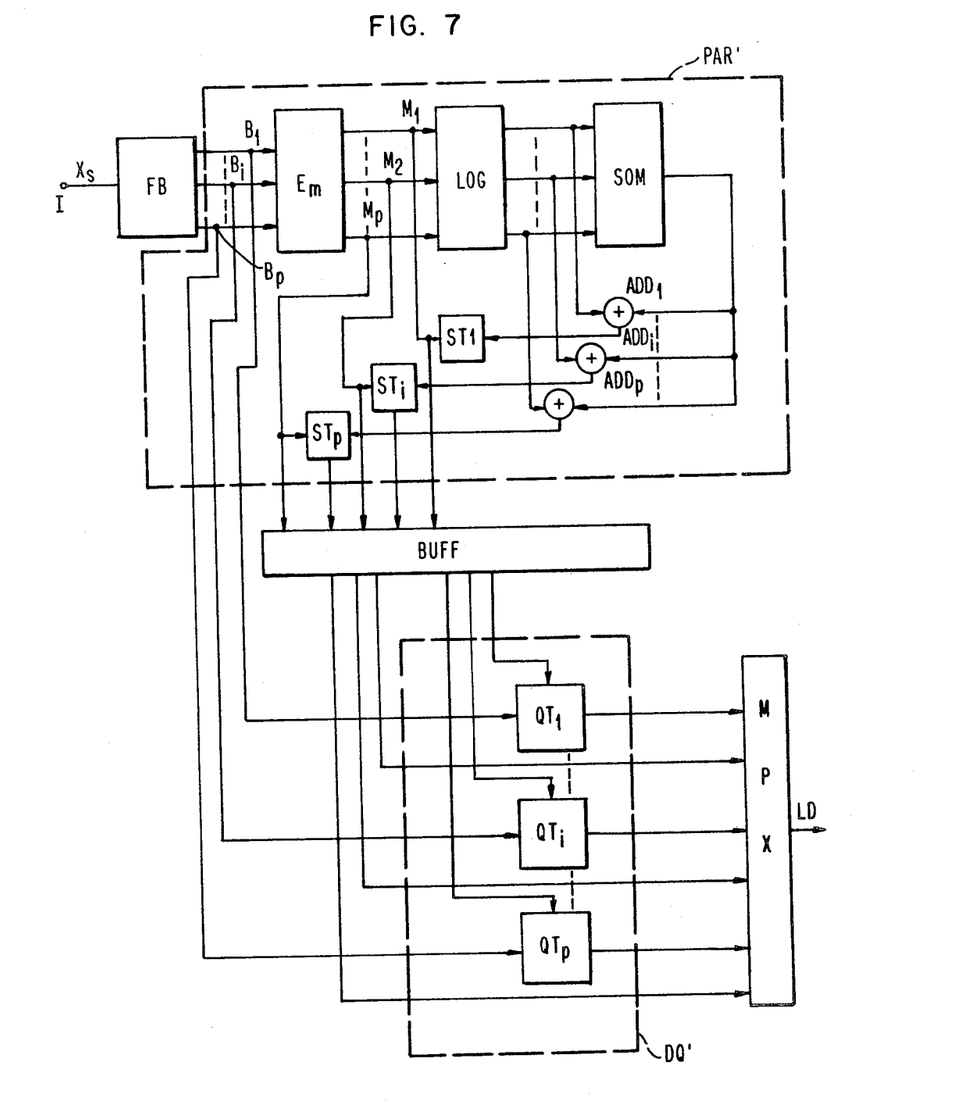
FIG. 7, is a schematic diagram of another embodiment of the requantizer shown in FIG. 1.

FIG. 6 is a schematic diagram of an improvement in the Transmission/Reception device of FIG. 3. This figure illustrates the elements of the coding and decoding systems of the type disclosed in the above-mentioned U.S. Patent, however, with a different amples of the various sub-bands appear simultaneously. In other words, if the instants at which the signal samples associated with a block appear at the output of the filter bank FB, are referred to as $t_1, t_2, \ldots, t_8$, the 128 samples of said block appear as shown in the following table.

| $t_8$, | $\ldots\ldots$, | $t_3$ | $t_2$ | $t_1$ |
|---|---|---|---|---|
| $X_8^1$, | $\ldots\ldots$, | $X_3^1$, | $X_2^1$, | $X_1^1$ |
| $X_8^2$, | $\ldots\ldots$, | $X_3^2$, | $X_2^2$ | $X_1^2$ |
| . | | | | |
| $X_8^{16}$, | $\ldots\ldots$, | $X_3^{16}$, | $X_2^{16}$, | $X_1^{16}$ |

The parameters necessary for the requantizing of the signal samples illustrated in the above table, however, are available in buffer BUFF before the samples appear at the input of requantizer DQ. Consequently, requantizing can start at instant $t_1$, at which instant requantizer DQ will simultaneously start processing:

$$X_1^1, X_1^2, X_1^3, X_1^4, \ldots, X_1^{15}, X_1^{16}.$$

Figure 8:
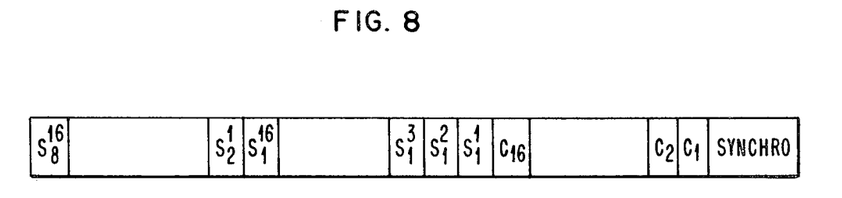
FIG. 8, is a schematic diagram of the format of a data block to be transmitted.

At instant $t_2$, the requantizing will proceed to sample group $X_2^1, X_2^2, \ldots, X_2^{16}$, and so on. The format of the bits transmitted over the digital transmission line LD by multiplexer MPX, then, is the one illustrated in FIG. 8.

Consequently, the second 16 ms delay mentioned in connection with FIG. 3 (see DL3 and DL4) is reduced to $16/8=2$ ms, because of the novel coder architecture described herein.

In view of this reduction, the echo applied to the differential transformer TD2 and which is a nuisance for speaker SP1 (see the communications system of FIG. 5) is reduced to $(2.5\times2+2)\times2=14$ ms. Such an echo is not a catastrophic disturbance to speaker SP1. Because of the symmetry of the communications system of FIG. 5, speaker SP2 is in the same conditions as speaker SP1 and the echo sent back to him by differential transformer TD3, also has a delay of 14 ms. It also can be neglected.

While the invention has been particularly shown and described with reference to a preferred embodiment thereof, it will be understood by those skilled in the art that numerous changes in form and detail may be made therein without departing from the spirit and scope of this invention.

We claim:

1. A method of transmitting a voice signal, the spectrum of which extends within a given frequency band, said method including the following steps:
   at the transmitter;
   sampling said voice signal;
   digitally coding the sample stream at a relatively high bit rate;
   filtering the digitally-coded signal into p frequency sub-bands;
   dividing the sample stream of the p sub-band filtered signals into consecutive blocks of samples of a given time duration;
   sequentially requantizing each of said blocks, said requantizing including a dynamic allocation of the bits allocated to the requantizing of the samples of the voice signal of each of said sub-bands, and including for the processing of each of the blocks to be requantized, the following operations:
      determining requantizing parameters of the sub-band, for each of said sub-bands, from the energy of the voice signal within said sub-band derived from the filtering and dividing operation of a given block of samples;
      quasi simultaneous requantizing the samples, upon said parameter determination, which samples are contained in each sub-band and derived from said given block of samples, using the requantizing parameters determined from the previous block of samples in the same sub-bands; and,
   transmitting in multiplex format the requantized signal samples over the p sub-bands together with requantizing parameters, for each block of samples.

2. A method of transmitting a voice signal the spectrum of which extends within a given frequency band, said method including the following steps:
   at the transmitter;
   sampling said voice signal substantially at Nyquist frequency;
   digitally coding the sample stream at a relatively high bit rate;
   filtering the digitally-coded signal into p frequency sub-bands;
   dividing the sample stream of the p sub-band filtered signals into consecutive blocks of samples of a given time duration;
   sequentially BCPCM block requantizing each of the sample blocks, said requantizing including, for each block:
   (a) determining the amplitude M of the largest sample contained within each of said sub-bands for the considered block;
   (b) determining a requantizing step for each sub-band, said step satisfying the relation:

$$Q_i = \frac{M_i}{2^{n_i-1}}$$

where: $n_i = 1/p \left[ N - \log \prod_{j=1}^{p} M_j \right] + \log M_i$ wherein $i = 1, 2, 3, \ldots, p$ is indicative of the order of the considered sub-band over the p sub-band assembly,
$n_i$ is representative of the requantizing bit rate associated with said sub-band of order i,
N is the total number of the bits to be allocated to the requantization of the p sub-bands;

$$N = \sum_{i=1}^{p} n_i$$

$M_i$, is the value of the amplitude of the largest sample for the sub-band of order i and for the considered block;
(c) requantizing the samples of each sub-band which samples are derived from the filtering of said considered block, by using the requantizing step determined for said sub-band by the processing of the samples belonging to the preceding block; and
transmitting in multiplex format the requantized samples appearing in the p sub-bands, together with the requantizing parameters for each sample block.

3. A method according to claim 2, wherein said parameters transmitted through the multiplex operation with each block of samples, are indicative of the value of the sample having the highest amplitude in each of the sub-bands within a given block of samples.

4. A transmission system for transmitting over a transmission line a voice signal the frequency spectrum of which extends within a given frequency band, said system including:
   sampling and coding means for sampling and coding said voice signal into a digital signal coded at a relatively high bit rate;
   means connected to said sampling and coding means for filtering the digitized voice signal spectrum into p sub-bands;
   means connected to said filtering means for dividing the sample stream of digitally coded signal into blocks of samples of a given time duration; requantizing means connected to said filtering means and including:
      energy measuring means connected to said filtering means for sorting on each sub-band the largest signal sample within each of said blocks of samples;
      logarithm generating means connected to said energy measuring means;
      adding means connected to said logarithm generating means;
      storing means connected to said energy measuring means to said logarithm generating means and to said adding means for storing data used to determine the requantizing parameters of each block of samples;
      a requantizer connected to said storing means and said filtering means for requantizing the samples provided on each of said sub-bands and derived from the filtering of a given block of samples, using the parameters provided by said storing means and derived from the preceding block of samples; and
   multiplexing means connected to said requantizer and to said filtering means, for multiplexing the requantized sample blocks with the requantizing parameters, over said transmission line.

5. A transmission system for transmitting over a digital transmission line a voice signal the spectrum of which extends within a given frequency band, said system including:

sampling and converting means for sampling said voice-signal and for digitally encoding the samples;

a tree type filter means connected to said sampling and converting means for filtering said spectrum into p sub-bands;

divider means for dividing the sample stream into blocks of a given time duration;

means connected to said filter means for measuring the amplitude of the largest amplitude sample M which appears in each sub-band within each sample block;

means connected to said amplitude measuring means for calculating the base-two logarithm of the samples M in each sub-band for each sample block:

first adding means connected to said logarithm calculating means for calculating:

$$1/p \left[ N - \sum_{i=1}^{p} \log M_i \right]$$

where N is a predetermined value indicative of the total number of the bits to be used in requantifying the signal samples over the p sub-bands;

$i = 1, 2, \ldots, p$ defines the order of the considered sub-band at the output of said filtering means;

second adding means connected to the outputs of said logarithm calculating means and said first adding means;

quantizing step generating means connected to said second adding means and said amplitude measuring means;

storing means connected to said amplitude measuring means and to said quantizing step generating means;

sub-band requantizing devices connected to said storing means and to said tree-shaped filtering means; and multiplexing means connected to said sub-band requantizing means and to said storing means.

* * * * *